US012007962B2

(12) United States Patent
Doji et al.

(10) Patent No.: US 12,007,962 B2
(45) Date of Patent: Jun. 11, 2024

(54) DATA MANAGEMENT SYSTEM AND MANAGEMENT METHOD

(71) Applicant: TOPCON CORPORATION, Tokyo (JP)

(72) Inventors: Atsushi Doji, Tokyo (JP); Toshio Yamada, Tokyo (JP); Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 17/793,881

(22) PCT Filed: Jan. 28, 2021

(86) PCT No.: PCT/JP2021/003021
§ 371 (c)(1),
(2) Date: Jul. 19, 2022

(87) PCT Pub. No.: WO2021/157464
PCT Pub. Date: Aug. 12, 2021

(65) Prior Publication Data
US 2023/0045338 A1 Feb. 9, 2023

(30) Foreign Application Priority Data
Feb. 4, 2020 (JP) ................. 2020-016910

(51) Int. Cl.
*G06F 16/00* (2019.01)
*G06F 16/21* (2019.01)
*G06Q 50/08* (2012.01)

(52) U.S. Cl.
CPC ........... *G06F 16/212* (2019.01); *G06Q 50/08* (2013.01)

(58) Field of Classification Search
CPC .............................. G06F 16/212; G06Q 50/08
(Continued)

(56) References Cited

U.S. PATENT DOCUMENTS 11,270,036 B2* 3/2022 El-Diraby ............... G06F 30/12
2004/0145614 A1* 7/2004 Takagaki ................ G06F 30/13
345/420

(Continued)

FOREIGN PATENT DOCUMENTS

JP 2013-149119 A 8/2013
JP 2017-191351 A 10/2017
(Continued)

OTHER PUBLICATIONS

International Search Report issued in the corresponding patent application No. PCT/JP2021/003021 dated Apr. 20, 2021.

*Primary Examiner* — Michelle N Owyang
(74) *Attorney, Agent, or Firm* — Studebaker & Brackett PC

(57) ABSTRACT

The present management system includes a design database recording member identification information and member shape information on construction members constituting a construction object, a measurement database recording point coordinates of measurement points of the construction object, a member shape information acquiring unit configured to acquire the member shape information of a shape calculation member selected among the construction members recorded in the design database, a member in-range determining unit configured to determine whether coordinates of an object point selected among the measurement points recorded in the measurement database are of the shape calculation member by using the member shape information of the shape calculation member, and an allocated measurement data creating unit configured to record the object point in association with member identification information of the shape calculation member in the measurement database.

17 Claims, 16 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 2017/0256100 A1* | 9/2017 | Lee | G06F 30/13 |
| 2020/0210630 A1* | 7/2020 | Ullom | G06T 15/005 |
| 2021/0055716 A1* | 2/2021 | Turner | G06F 16/289 |
| 2022/0198709 A1* | 6/2022 | Sudry | G06F 30/12 |

FOREIGN PATENT DOCUMENTS

| | | |
|---|---|---|
| JP | 2017-204222 A | 11/2017 |
| JP | 2019-021190 A | 2/2019 |
| KR | 10-2018-0131471 A | 12/2018 |
| KR | 10-2037331 B1 | 11/2019 |

\* cited by examiner

DATA MANAGEMENT SYSTEM AND MANAGEMENT METHOD

TECHNICAL FIELD

The present invention relates to a system, method, and program for managing data for design and construction of a construction object.

BACKGROUND ART

In recent years, in the field of construction, utilization of a 3D model called BIM (Building Information Modeling) has been promoted. BIM has been increasingly utilized at design sites, that is, planning, design planning, facility design, design analysis, architectural design, construction scheme, and component manufacturing. For example, Patent Literature 1 discloses a technology for utilizing BIM at manufacturing sites of members at a plant.

CITATION LIST

Patent Literature

Patent Literature 1: Japanese Published Unexamined Patent Application No. 2019-21190

SUMMARY OF INVENTION

Technical Problem

However, at construction sites, utilization of BIM has been delayed, and design and construction are managed by creating a working drawing in each process of construction based on design BIM created at the design sites, and acquiring measurement data with a scanner, in each process of construction. Therefore, when checking a construction status, design data and measurement data are compared with each other, and the comparison processing is performed by reading all object drawing data, so that the volume of data is heavy and handling of the data is inconvenient.

The present invention was made in view of this problem, and an object thereof is to improve the speed of data processing and work efficiency at the time of checking the construction status.

Solution to Problem

In order to solve the problem described above, a management method according to an aspect of the present invention includes, by transmitting and receiving information to and from a design database recording member identification information and member shape information on construction members constituting a construction object and a measurement database recording point coordinates of measurement points of the construction object, (A) a step of selecting a shape calculation member the shape of which is calculated among the construction members recorded in the design database, (B) a step of acquiring member shape information of the shape calculation member from the design database, (C) a step of selecting an object point as a determination object among the measurement points recorded in the measurement database, (D) a step of determining whether point coordinates of the object point are of the shape calculation member by using the member shape information of the shape calculation member, and (E) a step of recording, when the object point is of the shape calculation member, the object point in association with member identification information of the shape calculation member in the measurement database.

In the aspect described above, it is also preferable that, in the step (E), an allocated point cloud information table in which, with respect to the object point, identification information of the object point, point coordinates of the object point, and member identification information of the shape calculation member are associated with each other, is created in the measurement database.

In the aspect described above, it is also preferable that the management method includes, after the step (E), (F) a step of determining whether all of the construction members recorded in the design database have been checked, and when all of the construction members are not checked, returning to the step (A) and selecting another construction member as the shape calculation member.

In the aspect described above, it is also preferable that the management method includes, after the step (F), (G) a step of determining whether the object point does not correspond to any of the construction members, and when the object point does not correspond to any of the construction members, with respect to the object point, recording identification information of the object point, point coordinates of the object point, member identification information of the shape calculation member having the closest coordinates, and information indicating that no member corresponds to the object point in association with each other in the allocated point cloud information table.

In the aspect described above, it is also preferable that, in the step (D), data on member vertexes of the shape calculation member is used as the member identification information.

In the aspect described above, it is also preferable that, in the step (D), data on a member diameter of the shape calculation member is used as the member identification information.

In the aspect described above, it is also preferable that the management method includes (H) a step of selecting an object member to be compared among the construction members recorded in the design database, and (I) a step of reading measurement data with member identification information matching that of the object member from the allocated point cloud information table.

In the aspect described above, it is also preferable that, as a result of passing through the steps (A) to (F), the object point is stored in association with a plurality of construction members in the allocated point cloud information table.

A management program describing the management method according to the aspect described above as a computer program and enabling execution of the management method is also preferable.

In addition, in order to solve the problem described above, a management system according to an aspect of the present invention includes a design database recording member identification information and member shape information on construction members constituting a construction object, a measurement database recording point coordinates of measurement points of the construction object, a member shape information acquiring unit configured to acquire the member shape information of a shape calculation member selected among the construction members recorded in the design database, a member in-range determining unit configured to determine whether coordinates of an object point selected among the measurement points recorded in the measurement database are of the shape calculation member by using the member shape information of the shape calculation member, and an allocated measurement data creating unit configured to record the object point in association with member identification information of the shape calculation member in the measurement database.

In the aspect described above, it is also preferable that the allocated measurement data creating unit creates, in the measurement database, an allocated point cloud information table in which, with respect to the object point, identification information of the object point, point coordinates of the object point, and member identification information of the shape calculation member are associated with each other.

In the aspect described above, it is also preferable that the management system further includes an unallocated measurement data creating unit configured to check all of the construction members recorded in the design database, and when the object point does not correspond to any of the construction members, with respect to the object point, record identification information of the object point, point coordinates of the object point, member identification information of the shape calculation member having the closest coordinates, and information indicating that no member corresponds to the object point in association with each other in the allocated point cloud information table.

In the aspect described above, it is also preferable that the management system includes an allocated measurement data selecting unit configured to read, with respect to an object member selected among the construction members recorded in the design database, measurement data with member identification information matching that of the object member from the allocated point cloud information table.

Advantageous Effects of Invention

According to the data management system, management method, and management program of the present invention, the speed of data processing and work efficiency at the time of checking a construction status can be improved.

DESCRIPTION OF EMBODIMENTS

Next, preferred embodiments of the present invention will be described with reference to the drawings.

First Embodiment

Configuration of Management System According to First Embodiment

Figure 1:
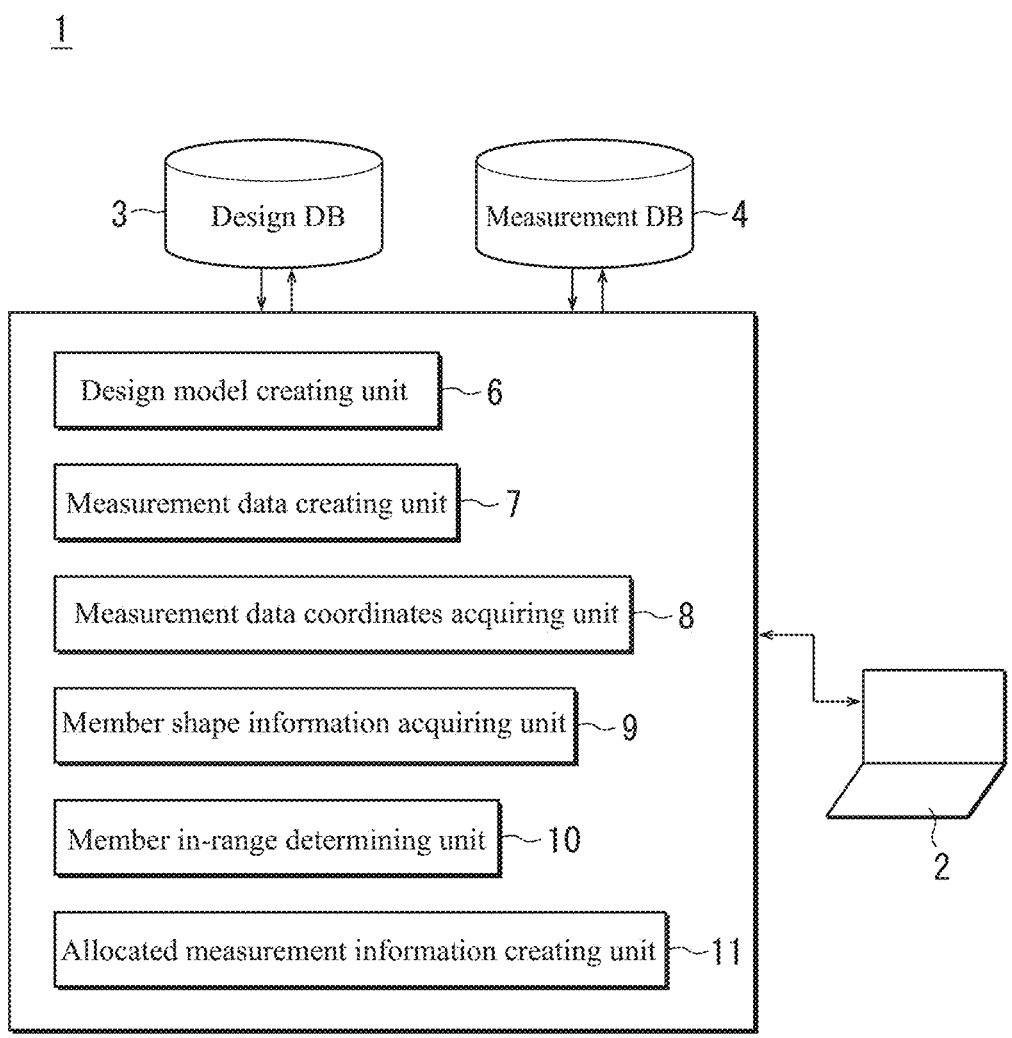
FIG. 1 is a configuration block diagram of a management system according to a first embodiment of the present invention.

FIG. 1 is a configuration block diagram of a management system 1 according to a first embodiment of the present invention. The management system 1 includes an input/output device 2, a design database 3, a measurement database 4, a design model creating unit 6, a measurement data creating unit 7, a measurement data coordinates acquiring unit 8, a member shape information acquiring unit 9, a member in-range determining unit 10, and an allocated measurement data creating unit 11.

The input/output device 2 is a general-purpose personal computer, tablet terminal, etc., including at least a computing unit, a recording unit, a communication unit, a display unit, and an operation unit, and can be operated by an administrator.

The respective functional units of the design model creating unit 6, the measurement data creating unit 7, the measurement data coordinates acquiring unit 8, the member shape information acquiring unit 9, the member in-range determining unit 10, and the allocated measurement data creating unit 11 are configured by electronic circuits such as a CPU (Central Processing Unit), an ASIC (Application Specific Integrated Circuit), and a PLD (Programmable Logic Device) such as an FPGA (Field Programmable Gate Array). The respective functional units may be configured inside the input/output device 2 or by either separate external hardware/software. In the latter case, the respective functional units can transmit and receive information to and from the input/output device 2 through a network.

The design database 3 and the measurement database 4 are stored in a server computer with which communication can be made through a network. The server computer can communicate with related functional units, and can transmit and receive information to and from the related functional units.

In the design database 3, design data based on design BIM of a construction object as a managing object (data on each construction member constituting the construction object in the form of 3D model, the 3D model includes shapes of surfaces, lines, and points. Hereinafter, also referred to as design model) is stored.

Figure 2:
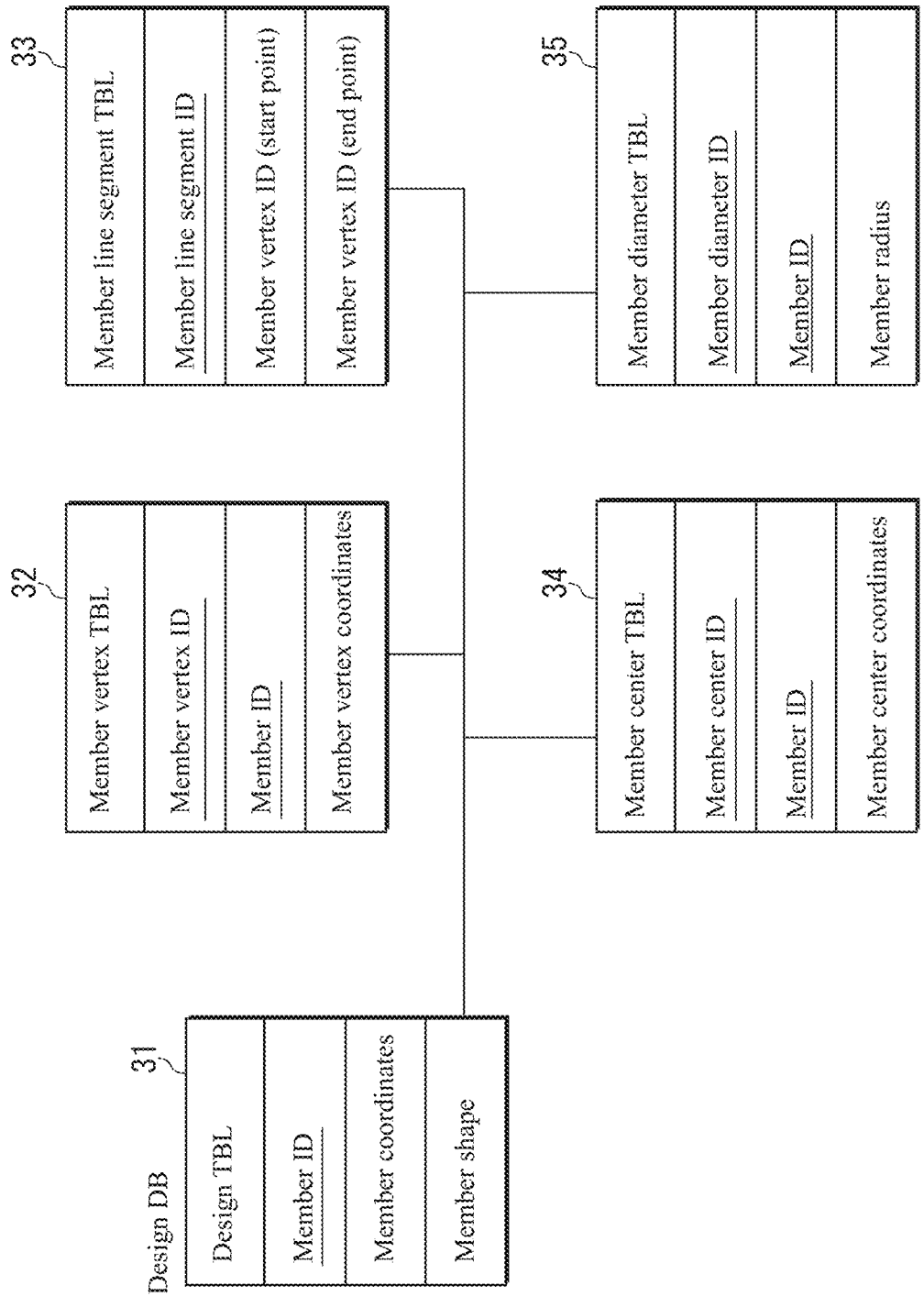
FIG. 2 is a diagram illustrating an example of a design database according to the same management system.

The design database 3 includes a design table 31 in which, with respect to each construction member, member identification information (hereinafter, referred to as member ID), member coordinates, and a member shape are associated with each other as illustrated in FIG. 2.

Among these, for the member shapes, a subordinate table for more finely managing the member shape information is provided. Preferably, as the member shape information, data on member vertexes and/or data on member diameters is provided. As an example, as the data on member vertexes, a combination of a member vertex table 32 and a member line segment table 33 is provided. As data on member diameters, a combination of a member center table 34 and a member diameter table 35 is provided.

In the member vertex table 32, with respect to each member, for each vertex of each member, member vertex identification information (hereinafter, referred to as member vertex ID), a member ID, and member vertex coordinates are stored in association with each other. In the member line segment table 33, with respect to each member, for each line segment of each member, member line segment identification information (hereinafter, referred to as member line segment ID), a member vertex ID of a start point of the line segment, and a member vertex ID of an end point of the line segment are stored in association with each other. The vertex is a point at which two straight lines cross at an angle. The line segment is a line connecting a vertex and a vertex.

In the member center table 34, with respect to each of center points of a top surface and a bottom surface of each member, member center identification information (hereinafter, referred to as member center ID), a member ID, and member center coordinates are stored in association with each other. In the member diameter table 35, with respect to each member, for a diameter of a bottom surface of each member, member diameter identification information (hereinafter, referred to as member diameter ID), a member ID, and a member radius are stored in association with each other.

Figure 3:
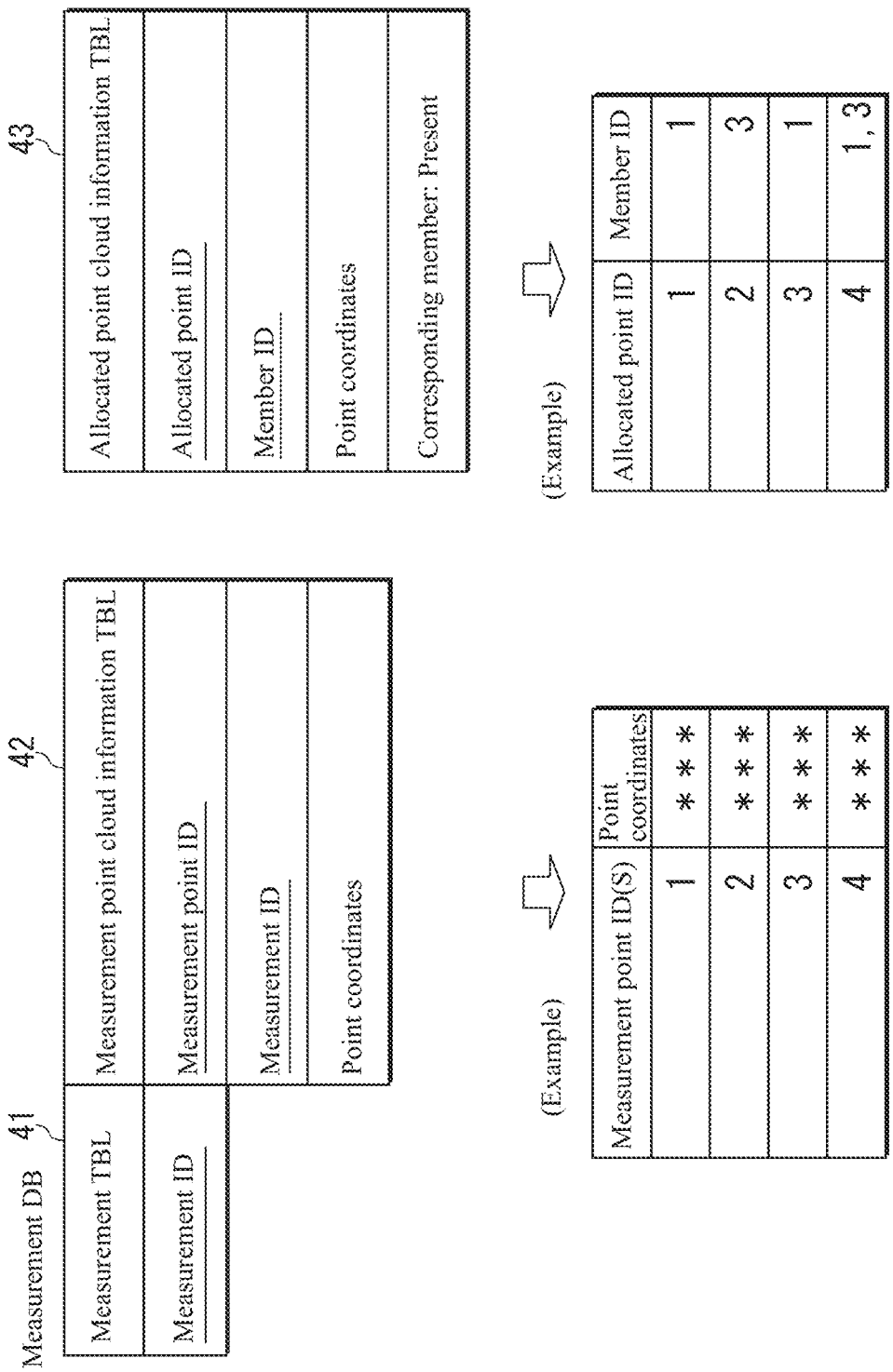
FIG. 3 is a diagram illustrating an example of a measurement database according to the same management system.

In the measurement database 4, measurement data of the construction object described above (point cloud data in which coordinate information is registered, point data, screen data holding coordinate information of measurement spots, and data on construction errors of construction members) obtained by using a scanner, etc., are stored. In the measurement data, a measurement ID is provided for each measurement according to, for example, a date, a time, and a location, etc. As illustrated in FIG. 3, the measurement database 4 includes a measurement table 41 for managing measurement IDs. In addition, the measurement database 4 includes a measurement point cloud information table 42 in which, for each measurement ID, with respect to a measurement point acquired in the measurement, identification information of the measurement point (hereinafter, referred to as measurement point ID), the measurement ID, and point coordinates are associated with each other.

The measurement database 4 further includes an allocated point cloud information table 43 for managing measurement points on a member-to-member basis. In the allocated point cloud information table 43, new identification information (hereinafter, allocated point ID) for a measurement point, a member ID corresponding to the design database 3, point coordinates, and information on whether there is a corresponding member, are stored in association with each other. For creating this allocated point cloud information table 43, the design model creating unit 6, the measurement data creating unit 7, the measurement data coordinates acquiring unit 8, the member shape information acquiring unit 9, the member in-range determining unit 10, and the allocated measurement data creating unit 11 function. These functional units will be described in the management method according to the present embodiment to be described below.

Management Method According to First Embodiment

Figure 4:
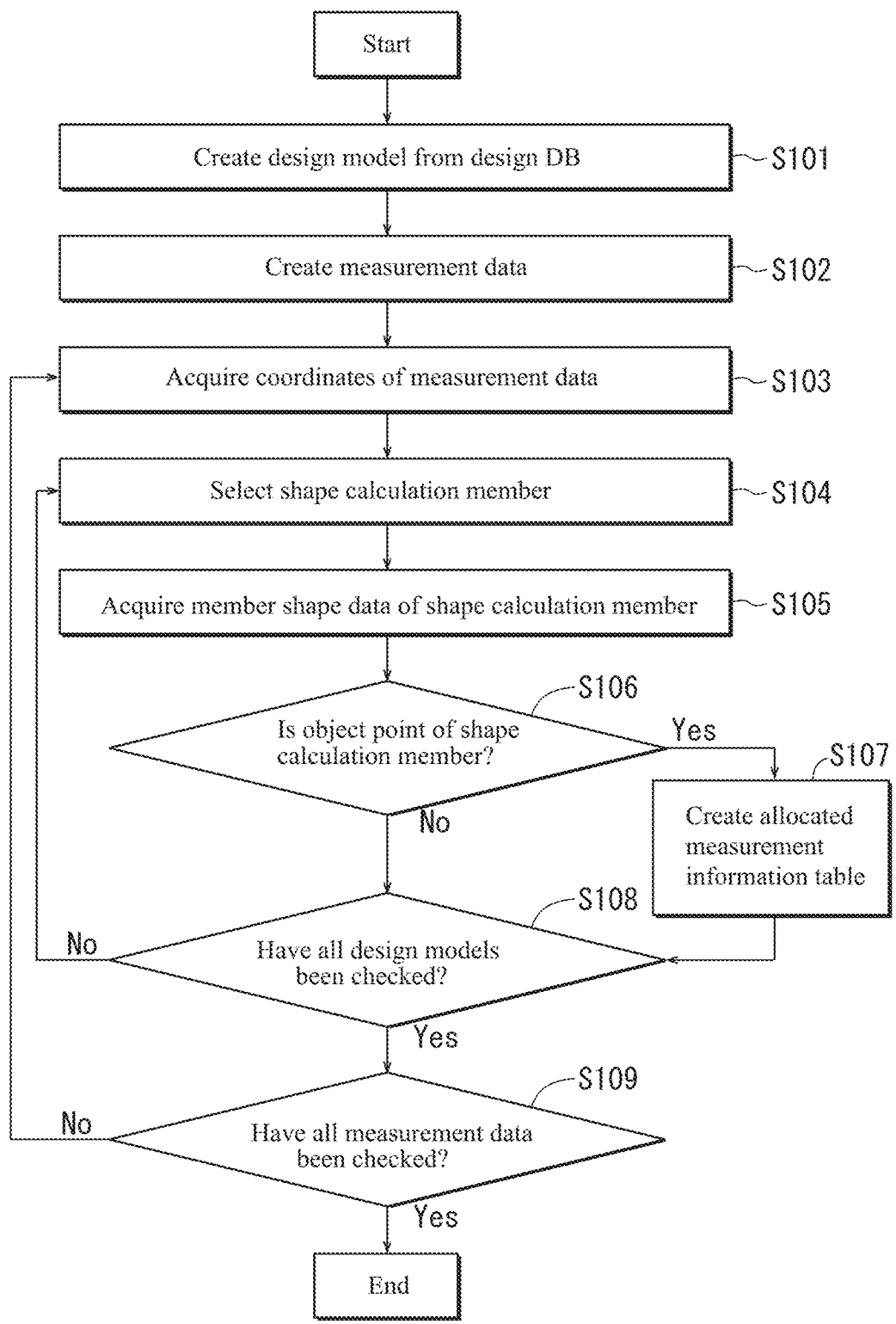
FIG. 4 is a management flowchart illustrating a management method according to the first embodiment of the present invention.

FIG. 4 is a management flowchart illustrating a management method according to the first embodiment of the present invention.

When management processing is started, in Step S101, the design model creating unit 6 reads the design table 31, and creates a design model of a construction member.

Next, the processing shifts to Step S102, and the measurement data creating unit 7 receives measurement data from the scanner, etc., and creates the measurement table 41 and the measurement point cloud information table 42.

Next, the processing shifts to Step S103, and the measurement data coordinates acquiring unit 8 acquires coordinates of all measurement points from the measurement point cloud information table 42.

Next, the processing shifts to Step S104, and the member shape information acquiring unit 9 checks the design model, and causes an administrator to select one member (shape calculation member) the shape of which is to be calculated by displaying the model on the input/output device 2.

Next, the processing shifts to Step S105, and the member shape information acquiring unit 9 acquires member shape information of the shape calculation member from the design database 3.

Next, the processing shifts to Step S106, and the member in-range determining unit 10 automatically selects or causes the administrator to select one point (object point) as a determination object among the measurement points, and determines whether the object point is of the shape calculation member. When the object point is of the shape calculation member, the processing shifts to Step S107, and when the object point is not of the shape calculation member, the processing shifts to Step S108.

In the case where the member in-range determining unit 10 automatically selects an object point, the selection is made so as to avoid duplication according to a rule determined in advance. As an example, when the measurement point IDs are provided as numbers as illustrated in FIG. 3, the measurement point IDs are arranged in descending order, and are selected in order from the top. In the determination as to whether the object point is of the shape calculation member, not only an object point whose coordinates are completely included in the shape calculation member but also an object point whose coordinates fall within an acceptable error range set in advance are determined to be of the shape calculation member.

When the processing shifts to Step S107, with respect to the object point, the allocated measurement data creating unit 11 provides a new allocated point ID with respect to the measurement point ID, stores the allocated point ID and the coordinates of the object point in the allocated point cloud information table 43 together with the member ID of the shape calculation member, and determines that a corresponding member is "Present," and the processing shifts to Step 108.

When the processing shifts to Step S108, the allocated measurement data creating unit 11 determines whether all of the construction members of the design model have been checked for the object point. When there are unchecked construction members, the processing returns to Step S104, and another member is selected as the shape calculation member and the flow is repeated. After all of the construction members are checked, the processing shifts to Step S109.

When the processing shifts to Step S109, the allocated measurement data creating unit 11 determines whether all measurement points in the measurement database 4 have been checked. When there are unchecked points, the processing returns to Step S103 and another point is selected as the object point, and the flow is repeated. After all points are checked, the flow is ended.

Here, examples of the method for determining whether an object point is of a shape calculation member, that is, details of Steps S105 and S106 will be provided. The following examples are just examples, and are not intended to prevent use of other member shape information.

Method Example 1

Figure 5:
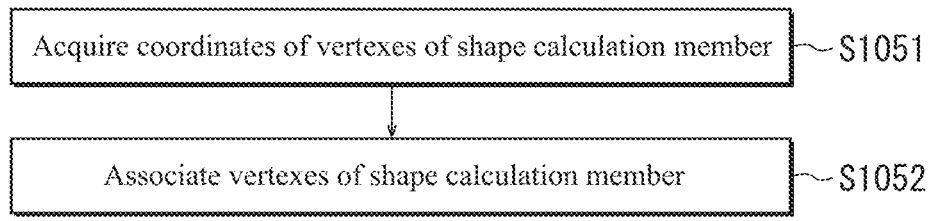
FIG. 5 is a flowchart illustrating an example of acquisition of member shape information in the same management flow.

In a method example 1, the acquisition of member shape information in Step S105 is performed by using data on member vertexes of a shape calculation member according to the flow of FIG. 5. When a shape calculation member is selected in Step S104, the processing shifts to Step S1051 and the member shape information acquiring unit 9 acquires member vertex IDs and member vertex coordinates of the shape calculation member based on a member ID of the shape calculation member by referring to the member vertex table 32. Next, the processing shifts to Step S1052, and with respect to the vertexes acquired in Step S1051, the member shape information acquiring unit 9 acquires member line segment IDs connecting vertexes of the shape calculation member based on the member vertex IDs by referring to the member line segment table 33, and associates the vertexes acquired in Step S1051 in their adjacency relationship.

Figure 6:
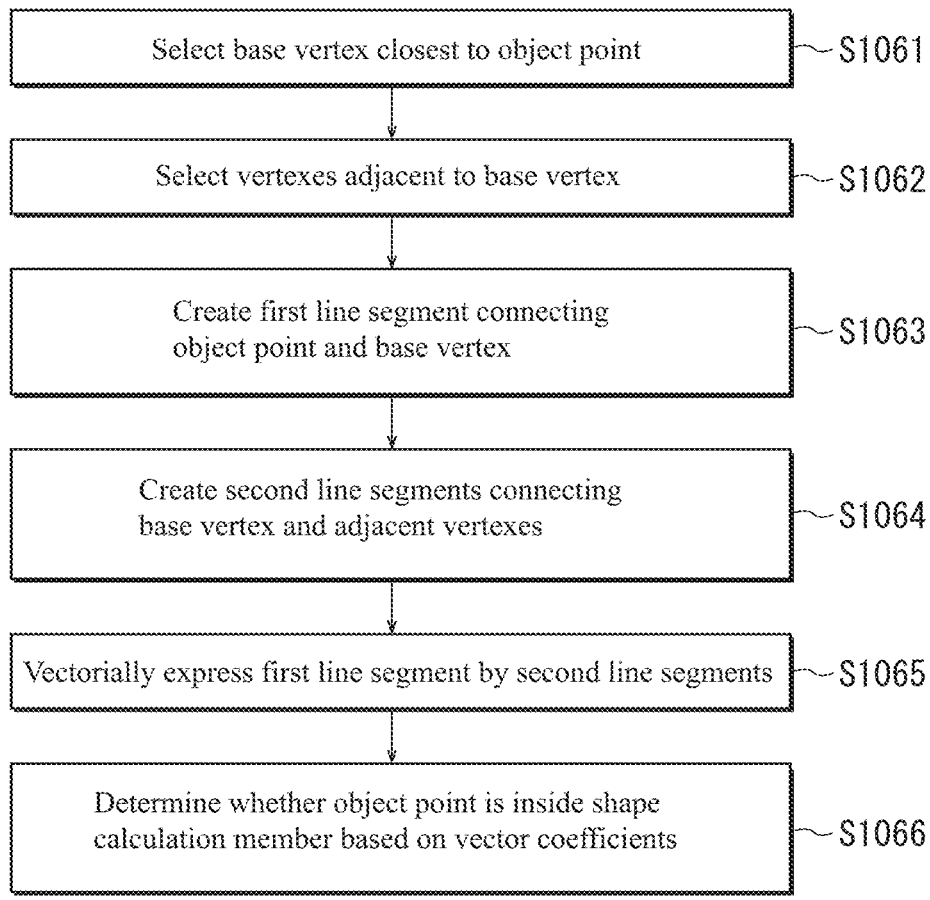
FIG. 6 is a flowchart illustrating an example of member in-range determination in the same management flow.
Figure 7:
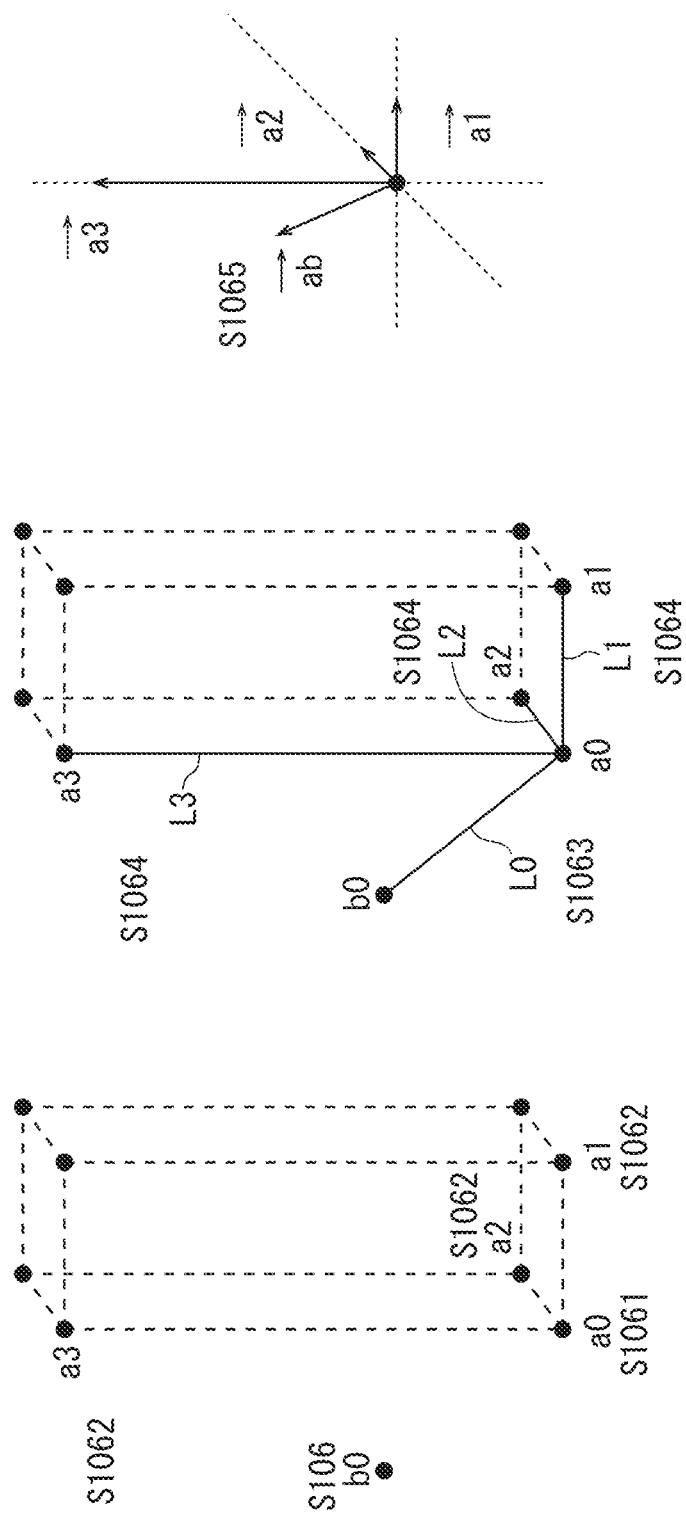
FIG. 7 is a view illustrating a work image of FIG. 6.

In the method example 1, the determination in Step S106 is performed according to the flow of FIG. 6. A work image of the same processing flow is illustrated in FIG. 7. When an object point ($b_0$) is selected in Step S106, the processing shifts to Step S1061, and the member in-range determining unit 10 selects a base vertex ($a_0$) closest to the object point ($b_0$). At this time, "closest" means that member vertex coordinates at a shortest three-dimensional linear distance are selected.

Next, the processing shifts to Step S1062, and the member in-range determining unit 10 reads the member line segment table 33, and based on a member vertex ID of the base vertex ($a_0$), selects vertexes that share line segments with the vertex ($a_0$), that is, selects the adjacent vertexes ($a_1$), ($a_2$), and ($a_3$).

Next, the processing shifts to Step S1063, and the member in-range determining unit 10 creates a primary line segment ($L_0$) connecting the object point ($b_0$) and the base vertex ($a_0$).

Next, the processing shifts to Step S1064, and the member in-range determining unit 10 creates secondary line segments ($L_1$), ($L_2$), and ($L_3$) connecting the vertex ($a_0$) and the adjacent vertexes ($a_1$), ($a_2$), and ($a_3$).

Next, the processing shifts to Step S1065, and the member in-range determining unit 10 expresses the primary line segment ($L_0$) by the following Numerical Formula 1 expressing the secondary line segments ($L_1$), ($L_2$), and ($L_3$) as unit vectors $a_1$, $a_2$, and $a_3$. Note that A1, A2, and A3 are real coefficients.

$$\vec{ab} = A1*\vec{a1} + A2*\vec{a2} + A3*\vec{a3}$$ [Numerical Formula 1]

Next, the processing shifts to Step S1066, and the member in-range determining unit 10 determines whether the object point ($b_0$) is within a certain range with respect to the shape calculation member based on a calculated distance in each following case.

(Case 1) When all of A1 to A3 are positive numbers: The point ($b_0$) is inside the shape calculation member, so that the point ($b_0$) is determined to be a point of the shape calculation member.

(Case 2) When all of A1 to A3 are negative numbers: When a distance value between the point ($a_0$) and the point ($b_0$) is within an acceptable error range, the point ($b_0$) is determined to be a point of the shape calculation member.

(Case 3) When only one of A1 to A3 is a positive number: Assuming that a vertex whose coefficient is positive is a point ($a_N$), when the point ($b_0$) is within an acceptable error range in a normal direction of a line connecting the point ($a_0$) and the point ($a_N$) as vertexes, the point ($b_0$) is determined to be a point of the shape calculation member.

(Case 4) When two of A1 to A3 are positive numbers: Assuming that vertexes whose coefficients are positive are respectively a point ($a_N$) and a point ($a_M$), when the point ($b_0$) is within an acceptable error range in a normal direction of a surface defined by vertexes at the point ($a_0$), the point ($a_N$), and the point ($a_M$), the point ($b_0$) is determined to be a point of the shape calculation member.

It is preferable that an acceptable error can be set for each member, for example, set to 5 cm when the member is a steel frame, and 1 cm when the member is a slab. It is also preferable that the acceptable error can be set for each three-dimensional direction for determination in the cases 3 and 4 described above.

Method Example 2

Figure 8:
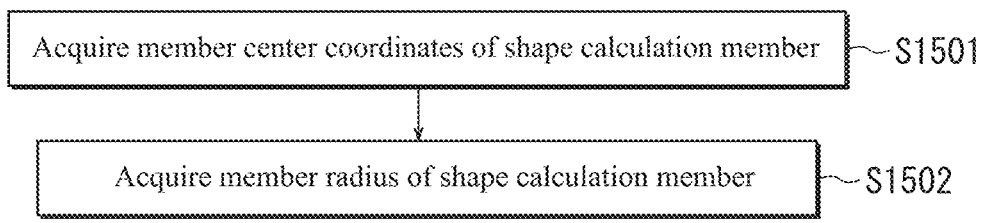
FIG. 8 is a flowchart illustrating another example of acquisition of member shape information in the same management flow.

In a method example 2, the acquisition of member shape information in Step S105 is performed by using data on a member diameter of the shape calculation member according to the flow of FIG. 8. Upon selection of the shape calculation member in Step S104, the processing shifts to Step S1501, and the member shape information acquiring unit 9 acquires member center coordinates of a top surface and a bottom surface of the shape calculation member by referring to the member center table 34. Next, the processing shifts to Step S1502, and by referring to the member diameter table 35, the member shape information acquiring unit 9 acquires a member radius of the shape calculation member based on a member ID of the shape calculation member.

Figure 9:
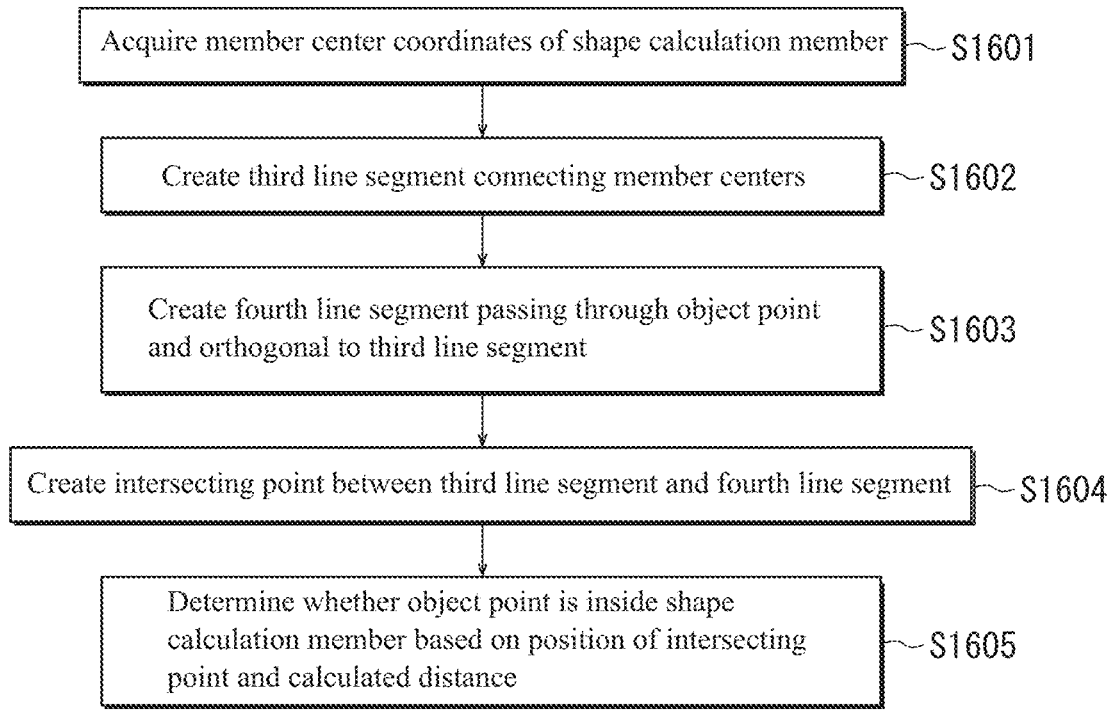
FIG. 9 is a flowchart illustrating another example of member in-range determination in the same management flow.
Figure 10:
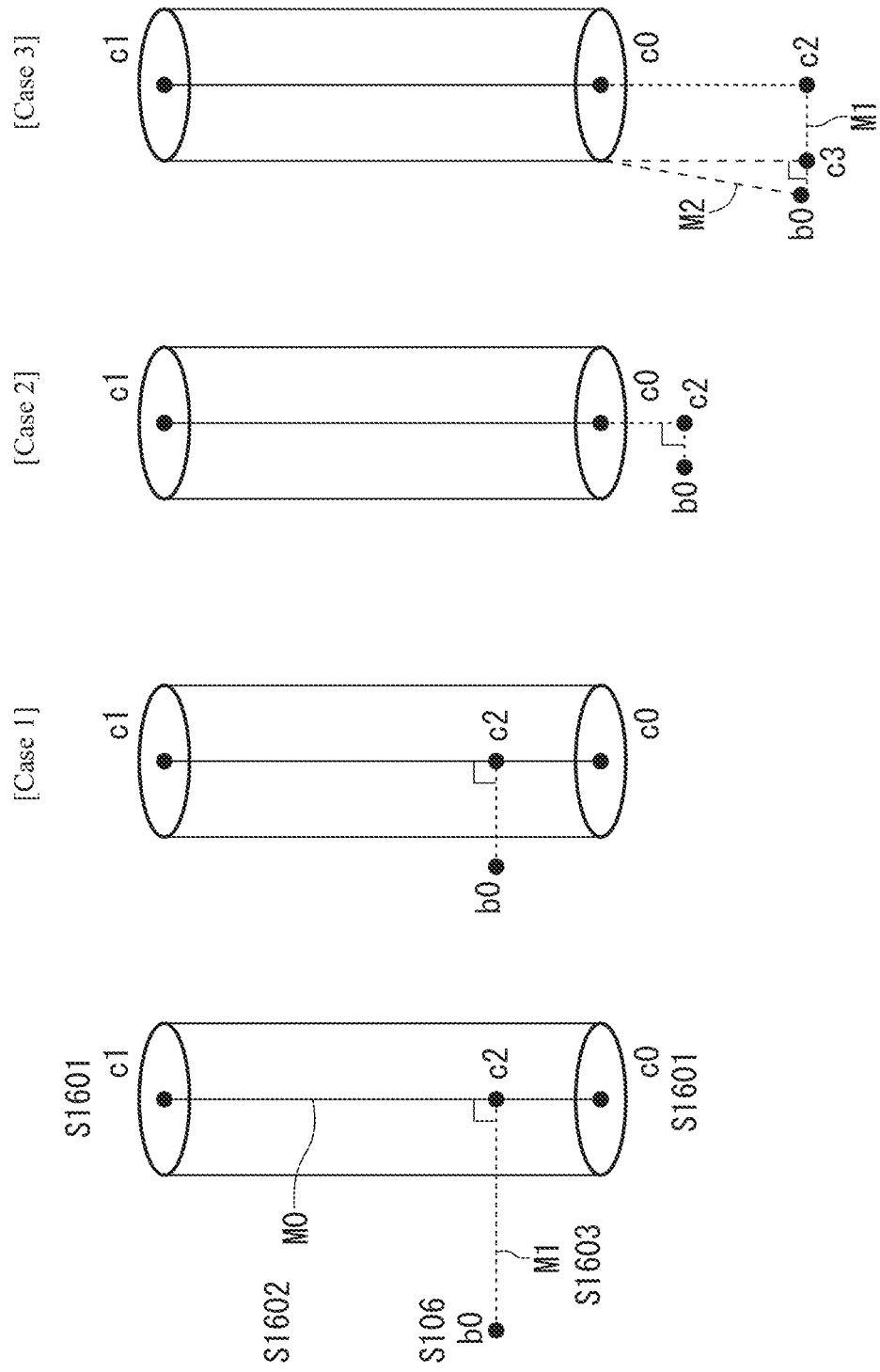
FIG. 10 is a view illustrating a work image of FIG. 9.

In the method example 2, the determination in Step S106 is performed according to the flow of FIG. 9. A work image of the same processing flow is illustrated in FIG. 10. When the object point ($b_0$) is selected in Step S106, the processing shifts to Step S1601, and the member in-range determining unit 10 acquires coordinates of member centers ($c_0$) and ($c_1$) of the top surface and the bottom surface of the shape calculation member based on the member ID of the shape calculation member.

Next, the processing shifts to Step S1602, and the member in-range determining unit 10 creates a first line segment ($M_0$) connecting the member centers ($c_0$) and ($c_1$).

Next, the processing shifts to Step S1603, and the member in-range determining unit 10 creates a second line segment ($M_1$) that passes through the object point ($b_0$) and is orthogonal to the line segment ($M_0$).

Next, the processing shifts to Step S1604, and the member in-range determining unit 10 creates an intersecting point ($c_2$) between the line segment ($M_0$) and the line segment ($M_1$).

Next, the processing shifts to Step S1605, and the member in-range determining unit 10 determines whether the object point ($b_0$) is within a certain range with respect to the shape calculation member based on the position of the intersecting point ($c_2$) and a calculated distance in each following case.
(Case 1) When the intersecting point ($c_2$) is on the line segment ($M_0$), and when a length obtained by subtracting the member radius from $|b_0-c_2|$ is within an acceptable error range, the point ($b_0$) is determined to be a point of the shape calculation member.
(Case 2) When the intersecting point ($c_2$) is not on the line segment ($M_0$), the length of $|b_0-c_2|$ is not more than the member radius, and the length of $|c_0-c_2|$ is within an acceptable error range, the point ($b_0$) is determined to be a point of the shape calculation member.
(Case 3) When the intersecting point ($c_2$) is not on the line segment ($M_0$), and the length of $|b_0-c_2|$ is more than the member radius, a point ($c_3$) moved toward the object point ($b_0$) side by a distance corresponding to the member radius from the intersecting point ($c_2$) on the line segment ($M_1$) is created, a length of a hypotenuse ($M_2$) of a right triangle sandwiched at a right angle between the line segment $b_0-c_3$ and the line segment $c_0-c_2$ is obtained, and when the length of the hypotenuse ($M_2$) is within an acceptable error range, the point ($b_0$) is determined to be a point of the shape calculation member.

In the method example 2, it is also preferable that the acceptable error can be set for each member. It is also preferable that the acceptable error can be set for each three-dimensional direction for determination in the case 3 described above.

As described above, according to the management method and the management system of the present embodiment, measurement data sorted only by measurement (measurement ID according to a date, a time, and a location, etc.) can be managed in a divided manner by being associated with each member in design data by creating the allocated point cloud information table 34.

In the management method, by setting the flow from Step S104 to Step S108, allocation of one measurement point to a plurality of construction members, like the "allocated point ID: 4" in the example of the allocated point cloud information table in FIG. 3, is also included. By permitting such duplicated allocation, when creating a model shape of each member from beginning based on measurement data, a measurement model with higher shape accuracy can be created.

In addition, by using the allocated point cloud information table 34, whether a point corresponds to a single member or a plurality of members can be identified for management, so that a measurement model of each member can be verified with high accuracy. For example, when it is desired to check flatness of a "slab," by selecting a cloud of points corresponding to only the "slab," accurate verification excluding information on other members can be performed.

Second Embodiment

A management system and a management method according to the present embodiment are additionally applied to the first embodiment. In the management system and the management method according to the present embodiment, information management is performed for measurement data for which there are no members to be corresponded as a result of determination in S108.

Configuration of Management System According to Second Embodiment

Figure 11:
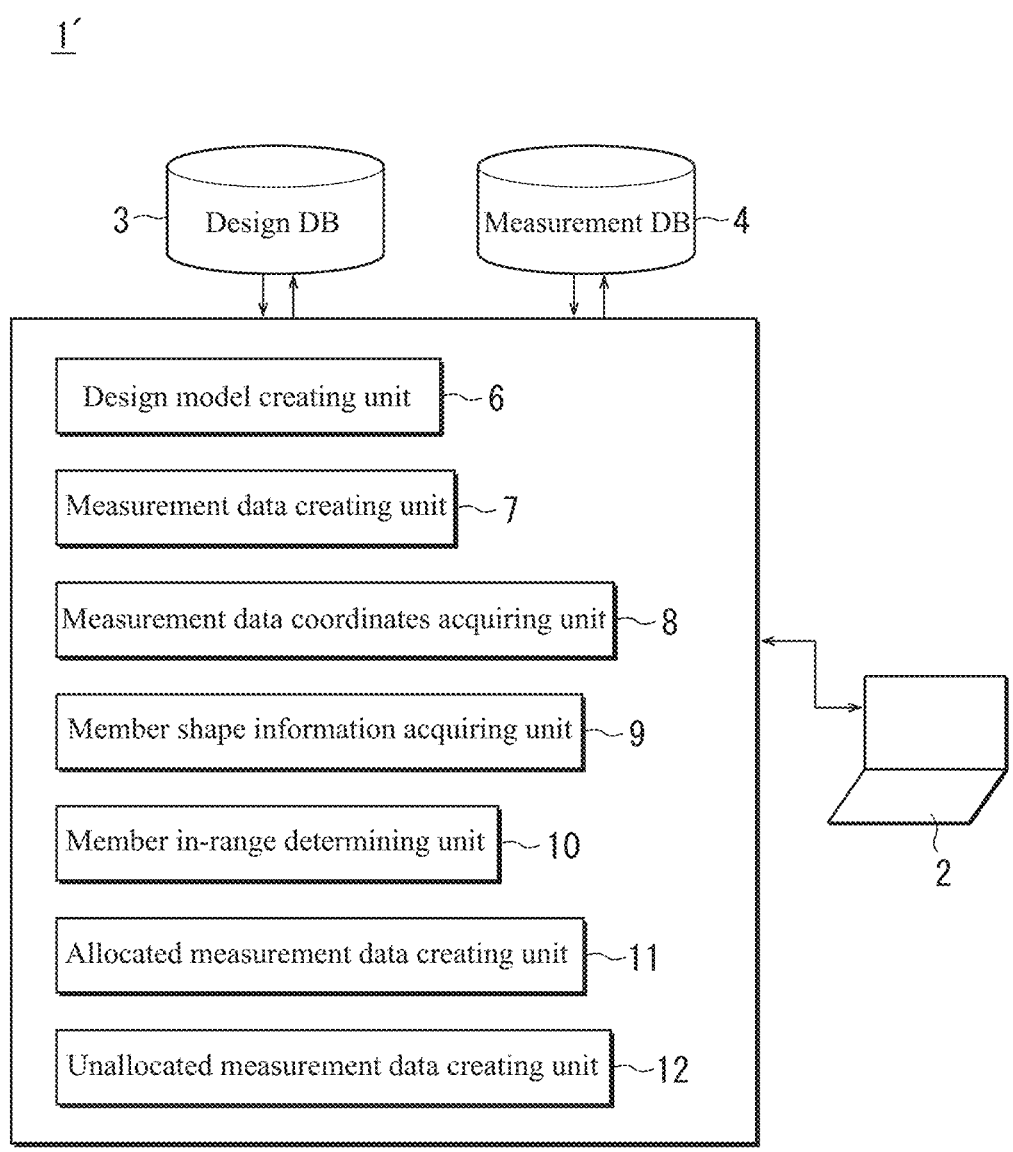
FIG. 11 is a configuration block diagram of a management system according to a second embodiment of the present invention.

FIG. 11 is a configuration block diagram of a management system 1' according to the second embodiment of the present invention. The same configuration as in the first embodiment is provided with the same reference sign, and description thereof is omitted. The management system 1' is configured by adding an unallocated measurement data creating unit 12 to the first embodiment.

The unallocated measurement data creating unit 12 is also configured by an electronic circuit as with other functional units. The unallocated measurement data creating unit 12 will be described in the management method according to the present embodiment to be described below.

Management Method According to Second Embodiment

Figure 12:
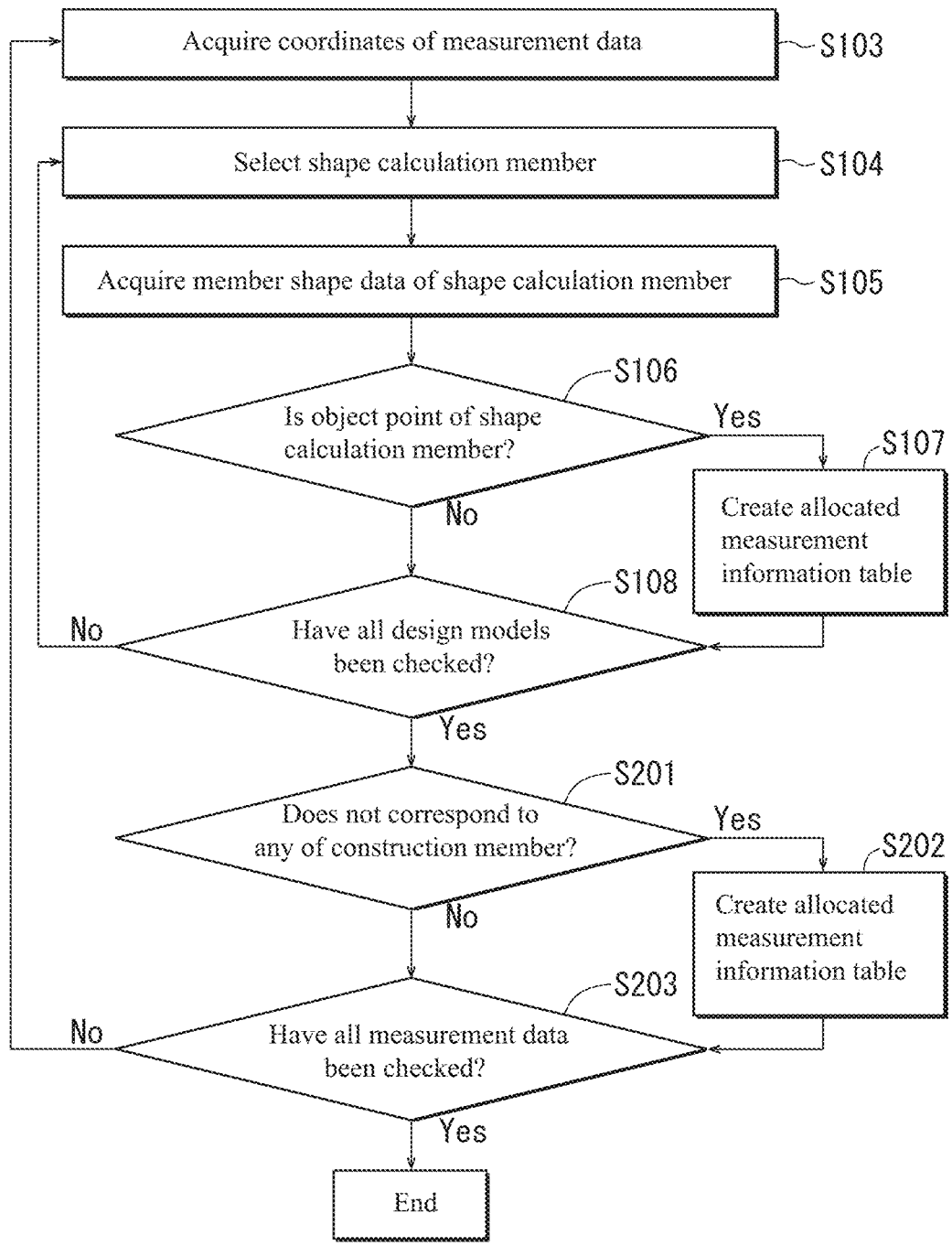
FIG. 12 is a management flowchart illustrating a management method according to the second embodiment of the present invention.
Figure 13:
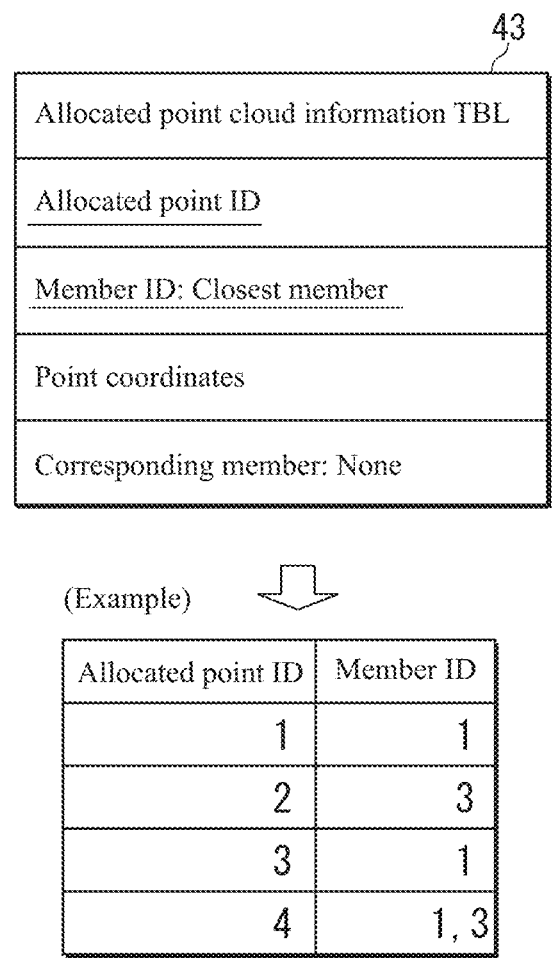
FIG. 13 is a view illustrating a work image of FIG. 12.

FIG. 12 is a management flowchart illustrating a management method according to the second embodiment of the present invention, and FIG. 13 is a work image view of the same management flow. The same method as in the first embodiment is provided with the same step number, and description thereof is omitted.

In management processing according to the present embodiment, the processes of Steps 101 to S108 of the first embodiment are performed, and after all design models are checked in Step S108, the processing shifts to Step S201 without ending the flow.

When the processing shifts to Step S201, the unallocated measurement data creating unit 12 checks whether the object point does not correspond to any of the construction members. When the object point does not correspond to any of the construction members (YES), the processing shifts to Step S202, and when the object point corresponds to any of the construction members, the processing shifts to Step S109.

When the processing shifts to Step 202, as illustrated in FIG. 13, for the object point, the unallocated measurement data creating unit 12 provides a new allocated point ID with respect to the measurement point ID, stores the allocated point ID and coordinates of the object point in the allocated point cloud information table 43 together with a member ID of a shape calculation member having the closest coordinates, and determines that "None" of the members corresponds to the object point, and continues the processing into Step S109.

As described above, according to the management method and management system of the present embodiment, data on an unallocated point which does not correspond to any of members in design data can be managed together with the information indicating that the point does not correspond to any of the members and information indicating that which member is close to the point. Measurement data classified as "Corresponding member: None" can be easily searched from the allocated point cloud information table 43, and use of data on such a member not described in the design model, for example, a light bulb or a desk, can be managed based on administrator's individual judgment.

Third Embodiment

A management system and a management method according to the present embodiment realizes efficient use of measurement data by utilizing data in the allocated point cloud information table 43 created in the first or second embodiment.

Configuration of Management System According to Third Embodiment

Figure 14:
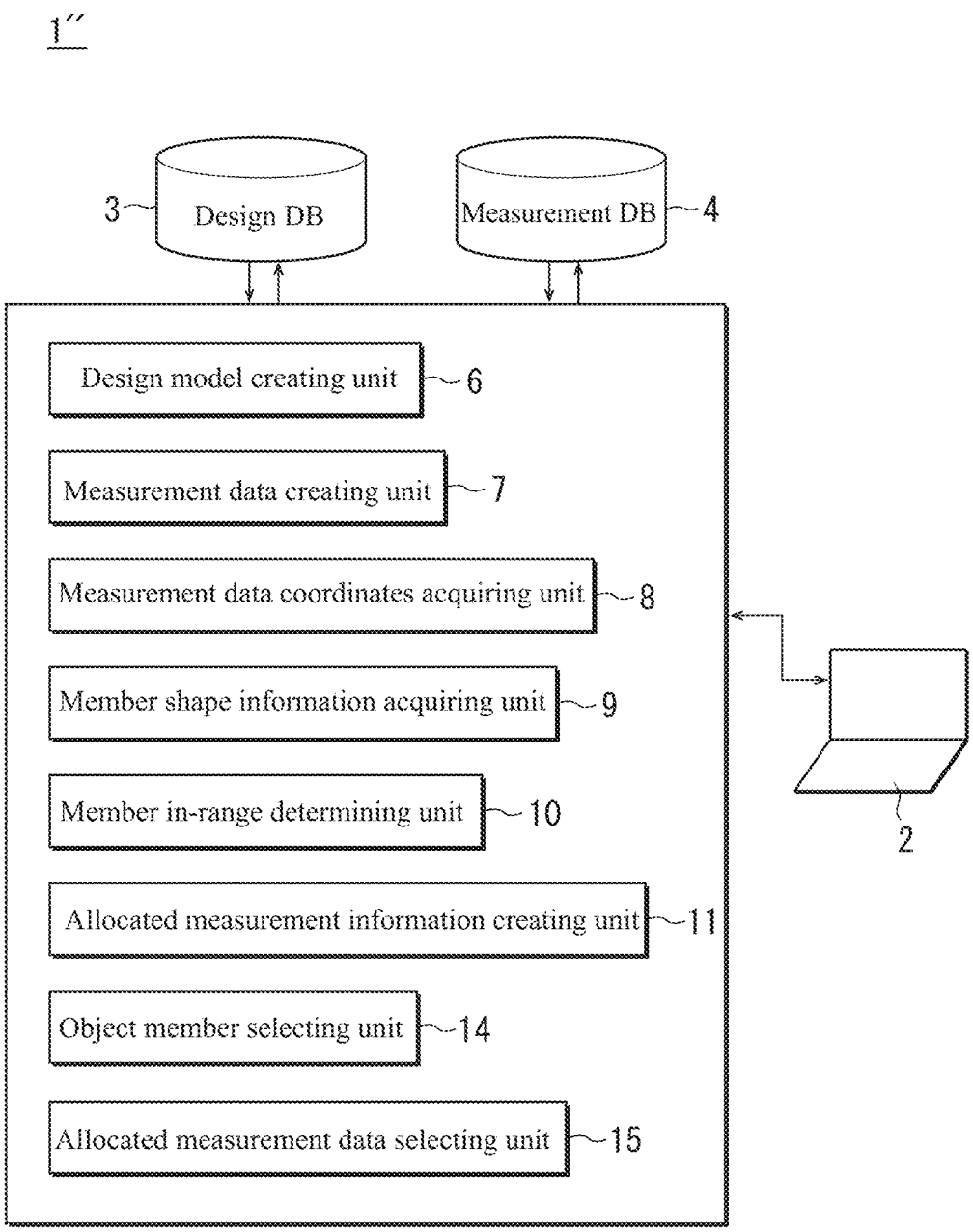
FIG. 14 is a configuration block diagram of a management system according to a third embodiment of the present invention.

FIG. 14 is a configuration block diagram of a management system 1" according to the third embodiment of the present invention. The management system 1" is additionally applied to the first or second embodiment. The present embodiment illustrates an example of application to the first embodiment. The same configuration as in the embodiment described above is provided with the same reference sign, and description thereof is omitted.

The management system 1" includes the input/output device 2, the design database 3, the measurement database 4, the design model creating unit 6, the measurement data creating unit 7, the measurement data coordinates acquiring unit 8, the member shape information acquiring unit 9, the member in-range determining unit 10, the allocated measurement data creating unit 11, an object member selecting unit 14, and an allocated measurement data selecting unit 15.

The object member selecting unit 14 and the allocated measurement data selecting unit 15 are also configured by electronic circuits as with other functional units. The respective functional units will be described in the management method according to the present embodiment to be described below.

Management Method According to Third Embodiment

Figure 15:
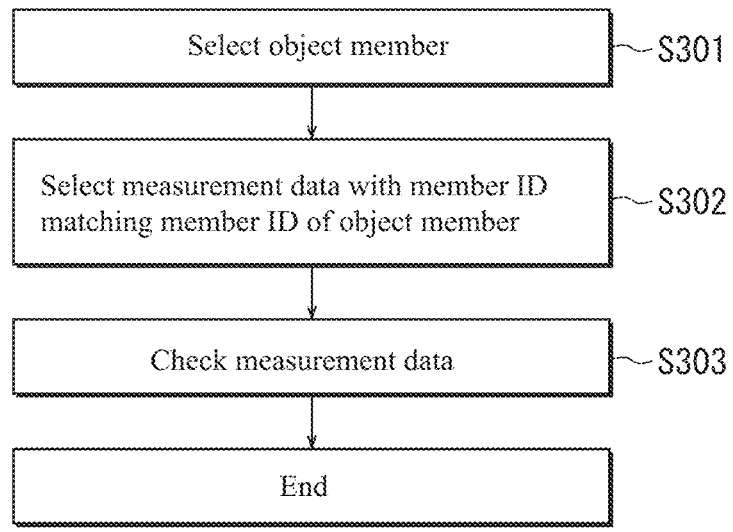
FIG. 15 is a management flowchart illustrating a management method according to the second embodiment of the present invention.
Figure 16:
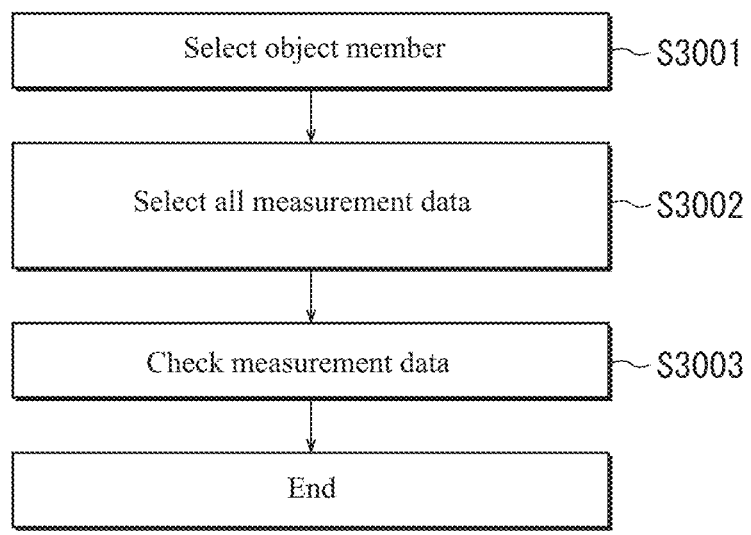
FIG. 16 is a management flowchart illustrating a conventional management method.
Figure 17:
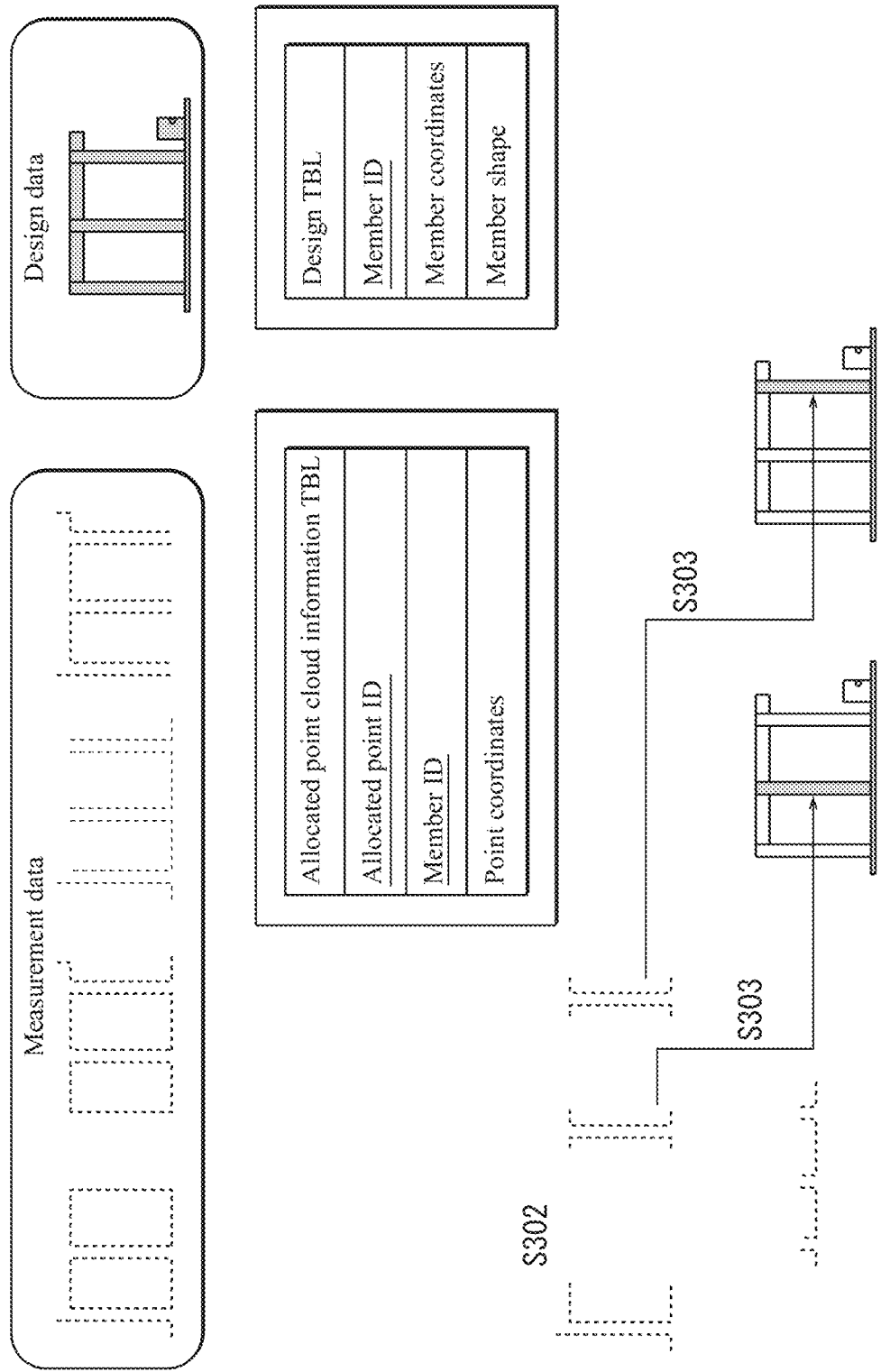
FIG. 17 is a view illustrating a work image of FIG. 15.
Figure 18:
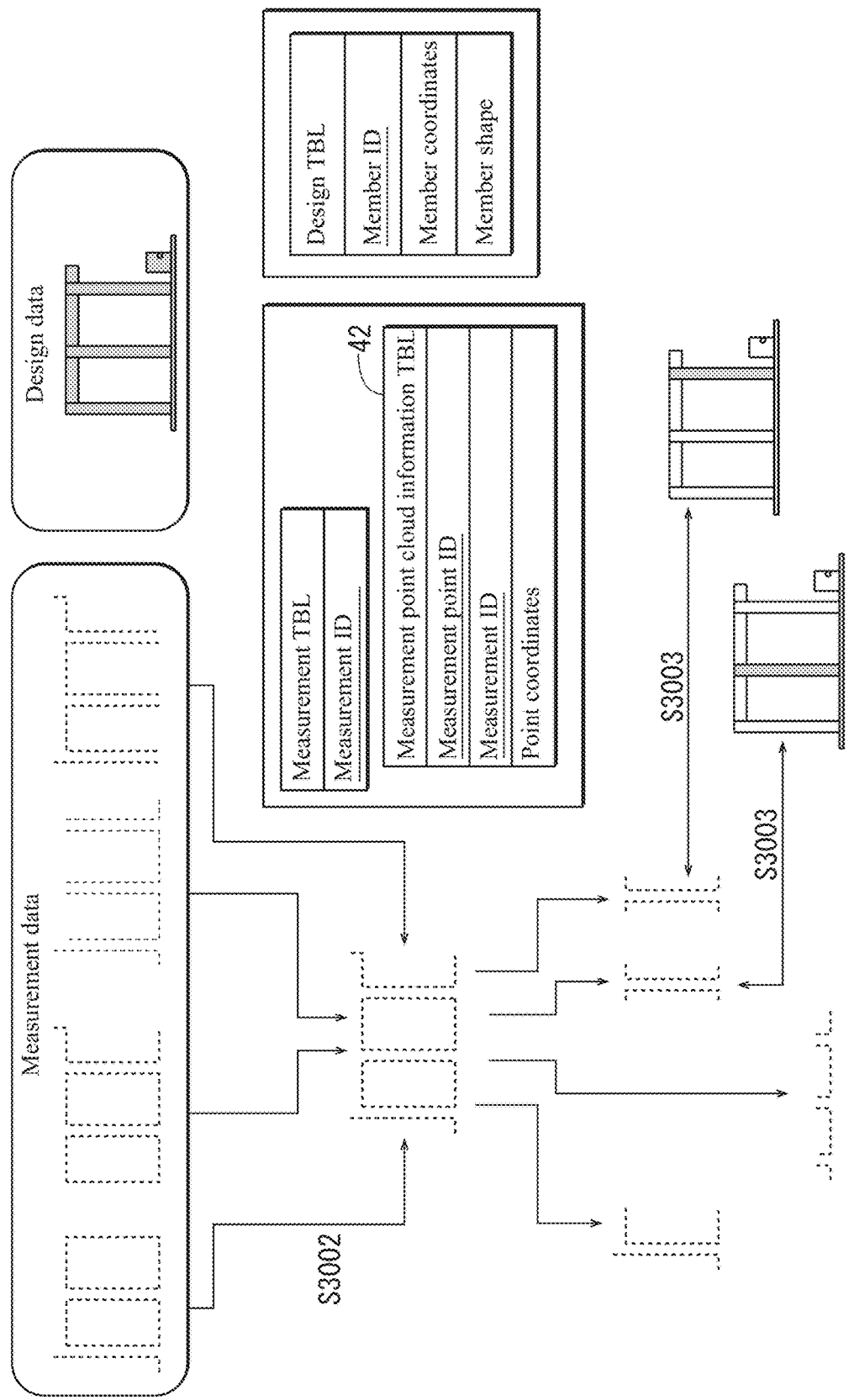
FIG. 18 is a view illustrating a work image of FIG. 16.

FIG. 15 is a management flowchart illustrating a management method according to the third embodiment of the present invention, and FIG. 16 is a management flowchart illustrating a conventional management method for comparison. FIG. 17 is a work image view of the management flow according to the present embodiment, and FIG. 18 is a work image view of the management flow according to the conventional management method for comparison.

First, the conventional management flow will be described with reference to FIGS. 16 and 18. When it is desired to check a construction status of a certain construction member in the design database, conventionally, as illustrated in FIG. 16, first, in Step S3001, an administrator selects a construction member to be compared (hereinafter, referred to as object member) from the design database. Next, the processing shifts to Step S3002, and the administrator reads measurement data from what corresponding to the "measurement point cloud information table 42" in the measurement database, selects a measurement ID of a measurement that seems to have been performed for the object member, and reads all measurement data linked to the measurement ID (FIG. 18). Thereafter, in Step S3003, it becomes possible to perform data selecting and checking works with respect to a cloud of points corresponding to the object member.

Whereas, the management flow according to the third embodiment will be described with reference to FIGS. 15 and 17. When it is desired to check a construction status of a certain construction member, in the present embodiment, as illustrated in FIG. 15, first, in Step S301, the object member selecting unit 14 causes an administrator to select an object member by displaying a design model on the input/output device 2 by referring to the design database 3. Next, the processing shifts to Step S302, the allocated measurement data selecting unit 15 reads the "allocated point cloud information table 43" in the measurement database 4, and selects measurement data with a member ID matching a member ID of the object member. Next, the processing shifts to Step S303, and the allocated measurement data selecting unit 15 enables data checking by displaying only the measurement data of the object member on the display unit, etc., of the input/output device 2.

As described above, conventionally, for comparing design data and measurement data with respect to an object member, all corresponding drawing data are read out, so that the volume of data is heavy, and handling of the data is inconvenient. On the other hand, in the management method and the management system of the present embodiment, the allocated point cloud information table 43 in which measurement data are allocated corresponding to each member in design data is created and held, so that reading of the measurement data of the object member is instantaneously completed. Therefore, data processing at the time of checking the construction status is significantly quickened, and the work is improved in efficiency.

Preferred embodiments and modifications of the present invention have been described above, and each embodiment and each modification can be combined based on the knowledge of a person skilled in the art, and such a combined embodiment is also included in the scope of the present invention.

REFERENCE SIGNS LIST

1, 1', 1" Management system
2 Input/output device
3 Design database
31 Design table
32 Member vertex table
33 Member line segment table
34 Member center table
35 Member diameter table
4 Measurement database
41 Measurement table
42 Measurement point cloud information table
43 Allocated point cloud information table
6 Design model creating unit
7 Measurement data creating unit
8 Measurement data coordinates acquiring unit
9 Member shape information acquiring unit
10 Member in-range determining unit
11 Allocated measurement data creating unit
12 Unallocated measurement data creating unit
14 Object member selecting unit
15 Allocated measurement data selecting unit

The invention claimed is:

1. A management method comprising: by transmitting and receiving information to and from a design database recording member identification information and member shape information on construction members constituting a construction object and a measurement database recording point coordinates of measurement points of the construction object,
 (A) a step of selecting a shape calculation member the shape of which is calculated among the construction members recorded in the design database;
 (B) a step of acquiring member shape information of the shape calculation member from the design database;
 (C) a step of selecting an object point in spatial units of points as a determination object among the measurement points recorded in the measurement database;

(D) a step of determining whether point coordinates of the object point are of the shape calculation member by setting a reference point in the shape calculation member to use a line segment between the object point and the reference point; and (E) a step of recording, when the object point is of the shape calculation member, the object point in association with member identification information of the shape calculation member in the measurement database.

2. The management method according to claim 1, wherein in the step (E), an allocated point cloud information table in which, with respect to the object point, identification information of the object point, point coordinates of the object point, and member identification information of the shape calculation member are associated with each other, is created in the measurement database.

3. The management method according to claim 1, comprising: after the step (E), (F) a step of determining whether all of the construction members recorded in the design database have been checked, and when all of the construction members are not checked, returning to the step (A) and selecting another construction member as the shape calculation member.

4. The management method according to claim 3, comprising: after the step (F), (G) a step of determining whether the object point does not correspond to any of the construction members, and when the object point does not correspond to any of the construction members, with respect to the object point, recording identification information of the object point, point coordinates of the object point, member identification information of the shape calculation member having the closest coordinates, and information indicating that no member corresponds to the object point in association with each other in the allocated point cloud information table.

5. The management method according to claim 1, wherein in the step (D), data on member vertexes of the shape calculation member is used as the member identification information.

6. The management method according to claim 1, wherein in the step (D), data on a member diameter of the shape calculation member is used as the member identification information.

7. The management method according to claim 2, comprising:

(H) a step of selecting an object member to be compared among the construction members recorded in the design database; and (I) a step of reading measurement data with member identification information matching that of the object member from the allocated point cloud information table.

8. The management method according to claim 3, wherein as a result of passing through the steps (A) to (F), the object point is stored in association with a plurality of construction members in the allocated point cloud information table.

9. The management method according to claim 1, wherein in the step (D) data on member vertexes of the shape calculation member and data on member line segment of the shape calculation member are used as the member identification information, and the step (D) includes (d1) a step of associating the member vertexes of the shape calculation member in their adjacency relationship, (d2) a step of selecting a base vertex closest to the object point as the reference point, (d3) a step of selecting vertexes adjacent to the base vertex, (d4) a step of creating a first line segment connecting the object point and the base vertexes, (d5) a step of creating second line segments connecting the base vertex and the adjacent vertexes, (d6) a step of vectorially expressing the first line segment by the second line segments, and (d7) a step of determining whether the object point is inside the shape calculation member based on vector coefficients.

10. The management method according to claim 1, wherein in step (D), data on a member center of a top surface and a bottom surface of the shape calculation member and data on a member diameter of the shape calculation member are used as the member identification information, and step (D) includes (d11) a step of creating a first line segment connecting the member centers of the top surface and the bottom surface, (d12) a step of creating a second line segment that passes through the object point and is orthogonal to the first line segment, (d13) a step of creates an intersecting point between the first line segment and the second line segment, and (d14) a step of determining whether the object point is within a certain range with respect to the shape calculation member based on the position of the intersecting point and a calculated distance between the object point and the intersecting point.

11. The management method according to claim 2, comprising: after step (E), (F) a step of determining whether all of the construction members recorded in the design database have been checked, and when all of the construction members are not checked, returning to the step (A) and selecting another construction member as the shape calculation member.

12. The management method according to claim 4, comprising:

(H) a step of selecting an object member to be compared among the construction members recorded in the design database; and (I) a step of reading measurement data with member identification information matching that of the object member from the allocated point cloud information table.

13. A management system comprising:

a design database recording member identification information and member shape information on construction members constituting a construction object;

a measurement database recording point coordinates of measurement points of the construction object; and an electronic circuit configured to acquire the member shape information of a shape calculation member selected among the construction members recorded in the design database;

to determine whether coordinates of an object point selected in spatial units of points among the measurement points recorded in the measurement database are of the shape calculation member by setting a reference point in the shape calculation member to use a line segment between the object point and the reference point; and record the object point in association with member identification information of the shape calculation member in the measurement database.

14. The management system according to claim 13, wherein the electronic circuit is configured to create, in the measurement database, an allocated point cloud information table in which, with respect to the object point, identification information of the object point, point coordinates of the object point, and member identification information of the shape calculation member are associated with each other.

15. The management system according to claim 14, wherein:

the electronic circuit is configured to check all of the construction members recorded in the design database, and when the object point does not correspond to any of the construction members, with respect to the object point, record identification information of the object point, point coordinates of the object point, member identification information of the shape calculation member having the closest coordinates, and information indicating that no member corresponds to the object point in association with each other in the allocated point cloud information table.

16. The management system according to claim 14, wherein the electronic circuit is configured to read, with respect to an object member selected among the construction members recorded in the design database, measurement data with member identification information matching that of the object member from the allocated point cloud information table.

17. The management system according to claim 15, wherein the electronic circuit is configured to read, with respect to an object member selected among the construction members recorded in the design database, measurement data with member identification information matching that of the object member from the allocated point cloud information table.

* * * * *